(12) United States Patent
Park et al.

(10) Patent No.: US 11,117,578 B1
(45) Date of Patent: Sep. 14, 2021

(54) VEHICLE CRUISE CONTROL METHOD AND CRUISE CONTROL

(71) Applicants: Hyundai Motor Company, Seoul (KR); Kia Motors Corporation, Seoul (KR)

(72) Inventors: Sun-Young Park, Busan (KR); Rosali Sun Pyun, Seongnam-si (KR); Sang-Bom Pyon, Hwaseong-si (KR); Chan-Hee Won, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/015,935

(22) Filed: Sep. 9, 2020

(30) Foreign Application Priority Data

Jun. 15, 2020 (KR) .................. 10-2020-0072243

(51) Int. Cl.
*B60W 30/14* (2006.01)
*B60W 50/14* (2020.01)

(52) U.S. Cl.
CPC .......... *B60W 30/14* (2013.01); *B60W 50/14* (2013.01); *B60W 2510/0208* (2013.01); *B60W 2510/0241* (2013.01); *B60W 2510/0291* (2013.01); *B60W 2510/0638* (2013.01); *B60W 2510/1005* (2013.01); *B60W 2520/00* (2013.01); *B60W 2540/10* (2013.01)

(58) Field of Classification Search
None
See application file for complete search history.

(56) References Cited

U.S. PATENT DOCUMENTS

| | | | |
|---|---|---|---|
| 10,189,345 B2 * | 1/2019 | Iwamitsu | B60L 50/16 |
| 10,407,064 B2 | 9/2019 | Lee et al. | |
| 10,737,687 B2 * | 8/2020 | Kim | B60W 50/029 |
| 2017/0267235 A1 | 9/2017 | Lee et al. | |

FOREIGN PATENT DOCUMENTS

| | | | | |
|---|---|---|---|---|
| DE | 102012108299 A1 * | 3/2013 | ......... | F02D 41/022 |
| EP | 1914435 A1 * | 4/2008 | ......... | B60W 30/16 |
| JP | 2019123327 A * | 7/2019 | | |
| KR | 20170107245 A | 9/2017 | | |
| WO | WO-2017200071 A1 * | 11/2017 | ............ | B60K 6/54 |

* cited by examiner

*Primary Examiner* — Dirk Wright
(74) *Attorney, Agent, or Firm* — Slater Matsil, LLP

(57) ABSTRACT

A method of operating a vehicle cruise control includes confirming, by a cruise controller, a cruise input while a vehicle travels, and releasing, by a clutch protection cruise control, a cruise operation based on an increase in a clutch temperature confirmed by a cruise control release condition one or more times during the cruise operation.

20 Claims, 5 Drawing Sheets

VEHICLE CRUISE CONTROL METHOD AND CRUISE CONTROL

CROSS-REFERENCE TO RELATED APPLICATIONS

This application claims priority to Korean Patent Application No. 10-2020-0072243, filed on Jun. 15, 2020, which application is hereby incorporated herein by reference.

TECHNICAL FIELD

The present disclosure relates to a vehicle cruise control and method thereof.

BACKGROUND

Generally, a manual transmission vehicle including an intelligent manual transmission (iMT) has an advantage in that a clutch is controlled in an electronic clutch control by a controller (for example, a transmission control unit), thereby not requiring a clutch pedal operation of a driver even in the manual transmission vehicle.

That is, the electronic clutch control controls the lock↔slip↔open of the clutch without using the clutch pedal regardless of the driver's request, and implements various clutch controls in an accelerator pedal connection method, a gear stage connection method, or a cruise control connection method with respect to the lock/slip/open of the clutch.

As an example, when the electronic clutch control is performed in the accelerator pedal connection method, the controller uses the accelerator pedal position scope in determining the required torque for meeting a target speed. Such a state corresponds to the general traveling/driving situations of a vehicle.

Accordingly, the electronic clutch control maintains the lock of the clutch when the pedal amount is large, the slip of the clutch when the pedal amount is normal, and the open of the clutch when the pedal amount is small.

In addition, when the electronic clutch control is performed in the gear stage connection method, the controller uses a required torque size which is changed by the high stage gear or the low stage gear engagement compared to a current vehicle speed in determining the required torque for matching the target speed.

Accordingly, the electronic clutch control opens the clutch to prevent turn-off when reaching an idle vehicle speed (for example, a vehicle speed corresponding to an idle revolution per minute (RPM) in the gear-engaged state) upon the high stage gear engagement compared to the vehicle speed, and then maintains the lock of the clutch when the pedal amount is large and the slip of the clutch when the pedal amount is normal, and the open of the clutch when the pedal amount is small according to the pedal position scope reflecting the operation of the accelerator pedal of the driver.

On the other hand, when the electronic clutch control is performed in the cruise connection method, the controller determines the torque required for matching a cruise target speed according to the cruise traveling as the required torque.

Accordingly, the electronic clutch control maintains the clutch in a slip state. The reason is that a difference value between "the target speed–the current vehicle speed" is constant during a cruise operation and thus the required torque is also constant, so that the required torque in the corresponding situation is a size sufficient for a slip control of the clutch, and due to such characteristics, the cruise traveling makes it easy to maintain the pedal position scope sufficient for the slip control for a long time unlike the situation in which it is difficult to maintain the pedal position scope sufficient for the slip control for a long time when the driver directly operates the accelerator pedal.

As described above, the electronic clutch control controls the clutch to be locked, slipped, or opened according to the driving conditions of the vehicle as a control irrelevant to the driver's request, thereby significantly increasing the consumer accessibility to the manual transmission vehicle.

However, since the electronic clutch control is irrelevant to the driver's request, the clutch control state may not be recognized by the driver. Accordingly, in the case of cruise traveling, the driver may not recognize that the cruise is in the slip state due to the electronic clutch control even while recognizing whether the cruise is operated.

As a result, the electronic clutch control controls the clutch during cruise traveling in the cruise connection method but the driver does not recognize it, so that the clutch becomes an over slip state, and the over slip increases the temperature of the clutch, thereby increasing the possibility of damage to the component of the clutch due to overheating.

Particularly, the clutch maintains the over slip for a few minutes to increase the temperature to 250° C., so that the over slip upon the cruise traveling may be at risk of reaching the temperature environment of 320° C. or more, which increases the possibility of damage due to overheating, and the increase in the temperature may be necessarily increased even more according to the weight and traveling state of the vehicle.

Moreover, the cruise control provided by the conventional iMT type manual transmission vehicle may turn the operation thereof on/off with a selection button, but the driver selection ON/OFF method is not connected to the clutch overheating, and thus is only the method having a fundamental problem which may not be in a situation in which the driver does not recognize the clutch overheating.

The contents described in this section are to help the understanding of the background, and may include what is not previously known to those skilled in the art to which the present disclosure pertains.

SUMMARY

The present disclosure relates to a vehicle cruise control. Particular embodiments relate to a cruise control system in which a cruise control protecting a clutch from clutch overheating due to a clutch slip during a cruise operation is implemented.

Accordingly, an embodiment of the present disclosure provides a vehicle cruise control method and cruise control system for protecting a clutch, which may change an electronic clutch control so that a clutch is not damaged due to an increase in the temperature of the slip of the clutch upon cruise traveling, and particularly, may use the clutch temperature as a control variable in a clutch slip state of the electronic clutch control, thereby releasing or prohibiting the cruise control during the cruise traveling regardless of a cruise button operation of a driver.

A vehicle cruise control method according to embodiments of the present disclosure includes a clutch protection cruise control which releases a cruise operation with respect to an increase in a clutch temperature confirmed by a cruise control release condition one or more times during the cruise operation, when a cruise input is confirmed by a cruise controller in a state where the overheating of the clutch is not confirmed while a vehicle travels.

As a preferred exemplary embodiment, the cruise controller confirms overheating of the clutch in a clutch state of any one of lock, open, and slip by the clutch controller.

As a preferred exemplary embodiment, the cruise controller turns on a clutch warning lamp on a cluster when the cruise operation is released.

As a preferred exemplary embodiment, a clutch protection cruise control method includes entering a cruise control recognizing an ON signal of a cruise button as an input signal, confirming clutch protection confirming the cruise control release condition one or more times, and automatically releasing the cruise in which the cruise operation is released.

As a preferred exemplary embodiment, the confirming of the clutch protection includes confirming the cruise control release condition with clutch information measured by the clutch, operating the cruise in which the clutch is continuously monitored during cruise traveling, and re-confirming the cruise control release condition with the clutch information measured by the clutch again.

As a preferred exemplary embodiment, the clutch information is a slip of the clutch and the clutch temperature.

As a preferred exemplary embodiment, the confirming of the cruise control release condition applies a clutch overheating temperature threshold to the clutch temperature measured by the clutch in the slip state, and the clutch overheating temperature threshold is applied with less than a clutch damage temperature.

As a preferred exemplary embodiment, the re-confirming of the cruise control release condition applies a clutch damage temperature threshold to the clutch temperature measured by the clutch in the slip state, and the clutch damage temperature threshold is applied with a clutch damage temperature or more.

As a preferred exemplary embodiment, the automatically releasing of the cruise is the stop of the cruise operation switching the cruise button to an OFF signal in the cruise controller, and the switching to the OFF signal is recognized by a driver by the turn-on of the clutch warning lamp provided on the cluster by the cruise controller.

As a preferred exemplary embodiment, the cruise controller performs a clutch confirmation control for confirming overheating of the clutch, and the clutch confirmation control method includes detecting vehicle information in the vehicle, confirming clutch information for the clutch, confirming a clutch state with a clutch temperature, and confirming the overheating.

As a preferred exemplary embodiment, the vehicle information is any one or more among a vehicle speed, an engine RPM, gear stages, an accelerator position scope, lock/slip/open of the clutch, and the clutch temperature.

As a preferred exemplary embodiment, the confirming of the clutch state applies a cruise blocking clutch temperature threshold to the clutch temperature, and the cruise blocking clutch temperature threshold is applied with a clutch damage temperature or a clutch overheating temperature.

As a preferred exemplary embodiment, the cruise controller blocks the cruise input when the overheating is confirmed, and turns on the clutch warning lamp provided on the cluster to cause a driver to recognize the impossibility of entering the cruise traveling.

In addition, a cruise control system according to embodiments of the present disclosure includes a cruise controller switching to cruise traveling entry impossibility by blocking a cruise input upon overheating of a clutch confirmed from vehicle information detected while a vehicle travels, and on the other hand, releasing a cruise operation with respect to an increase in a clutch temperature confirmed by a cruise control release condition one or more times during the cruise operation after entering the cruise control by confirming a cruise input signal in a non-overheating state, a sensor unit detecting the vehicle information to transmit it to the cruise controller, and a cruise button switching the cruise input from ON to OFF by releasing the cruise operation.

As a preferred exemplary embodiment, the sensor unit is applied with any one or more among a vehicle speed sensor detecting a speed, an engine RPM sensor measuring a revolution per minute (RPM) of an engine, a gear stage sensor detecting a location of shift gear stages, a pedal sensor detecting an accelerator position scope of an accelerator pedal, a clutch sensor detecting an operation state of the clutch as lock/slip/open, and a clutch temperature sensor detecting a temperature of the clutch.

As a preferred exemplary embodiment, the cruise controller is connected with a cluster, and the cluster transfers an operating signal of the cruise button to the cruise controller.

As a preferred exemplary embodiment, the cluster has a clutch warning lamp, and the clutch warning lamp is turned on upon the cruise traveling entry impossibility and the release of the cruise operation.

The clutch protection type cruise control implemented by the cruise control system applied to the vehicle of embodiments of the present disclosure implements the following operations and effects.

First, it is possible to protect the clutch from the slip of the clutch in the manual transmission vehicle. Second, as the cruise control is connected with the clutch, the clutch slip state of the electronic clutch control not recognized by the driver may be controlled. Third, the operation may be stopped (that is, ON→OFF switching) according to the degree of slip of the clutch upon the cruise control regardless of the driver's request. Fourth, even under the cruise control, the slip of the clutch by the electronic clutch control does not act as the cause of highly increasing the clutch temperature. Fifth, the clutch is not overheated (for example, 320° C. or more) even in the slip state, thereby completely eliminating the problem of the possibility of damage to the component of the clutch due to the increase in the temperature. Sixth, it is possible to protect the clutch even in the weight and traveling state of the vehicle in which the influence of temperature increase due to the slip is greater by preventing the overheating of the clutch. Seventh, it is possible to reinforce the clutch protection even in the electronic clutch control in the manual transmission vehicle, and particularly, to provide the driver convenience by the iMT-type manual transmission vehicle as it is, thereby further improving the merchantability of the vehicle.

DETAILED DESCRIPTION OF ILLUSTRATIVE EMBODIMENTS

Hereinafter, exemplary embodiments of the present disclosure will be described in detail with reference to the accompanying exemplary drawings, and these exemplary embodiments are examples and may be implemented by those skilled in the art in various different forms, and thus are not limited to the exemplary embodiments described herein.

Figure 1A:
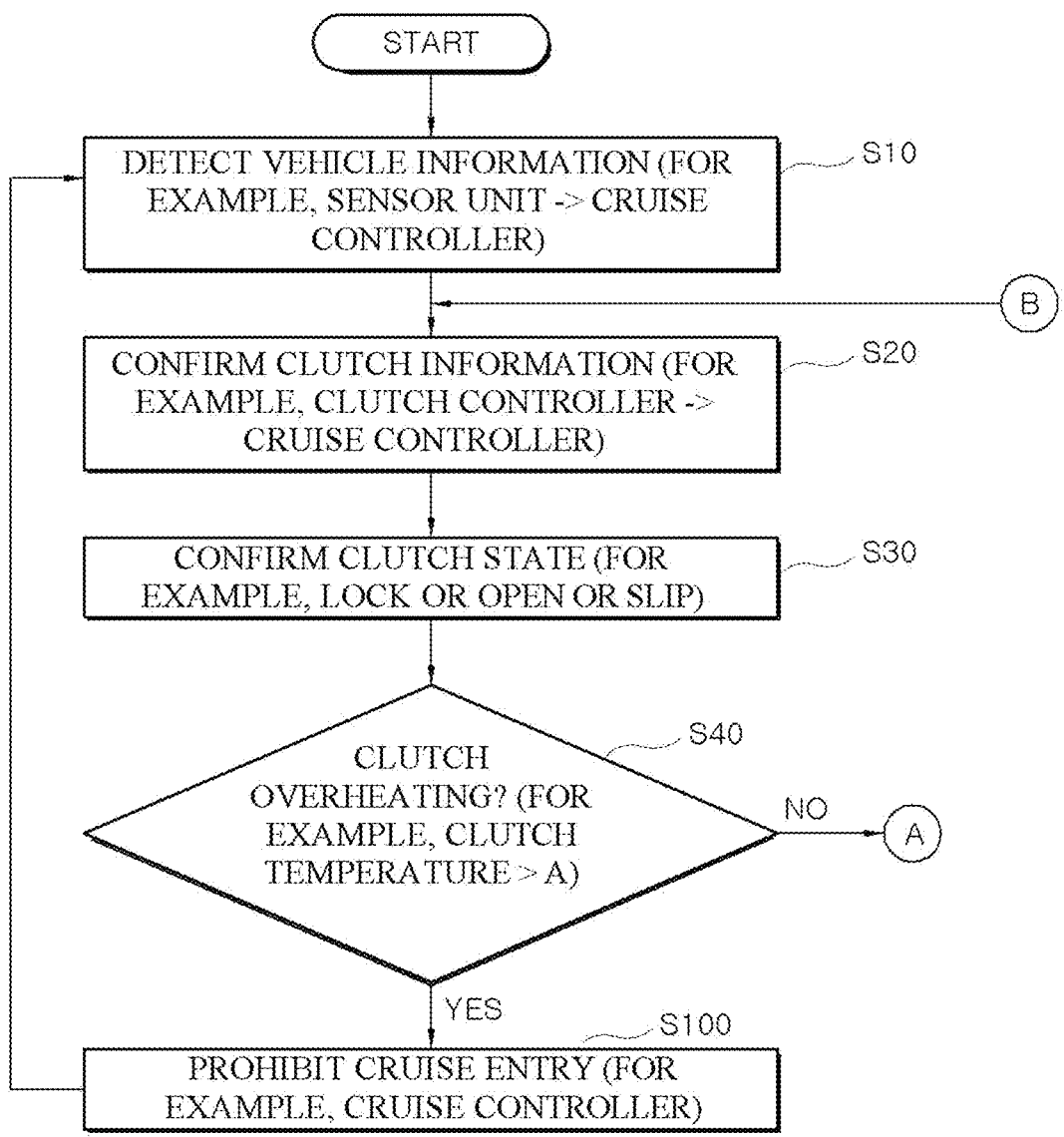
FIGS. 1A and 1B are a flowchart of a vehicle cruise control method for protecting a clutch according to embodiments of the present disclosure.
Figure 1B:
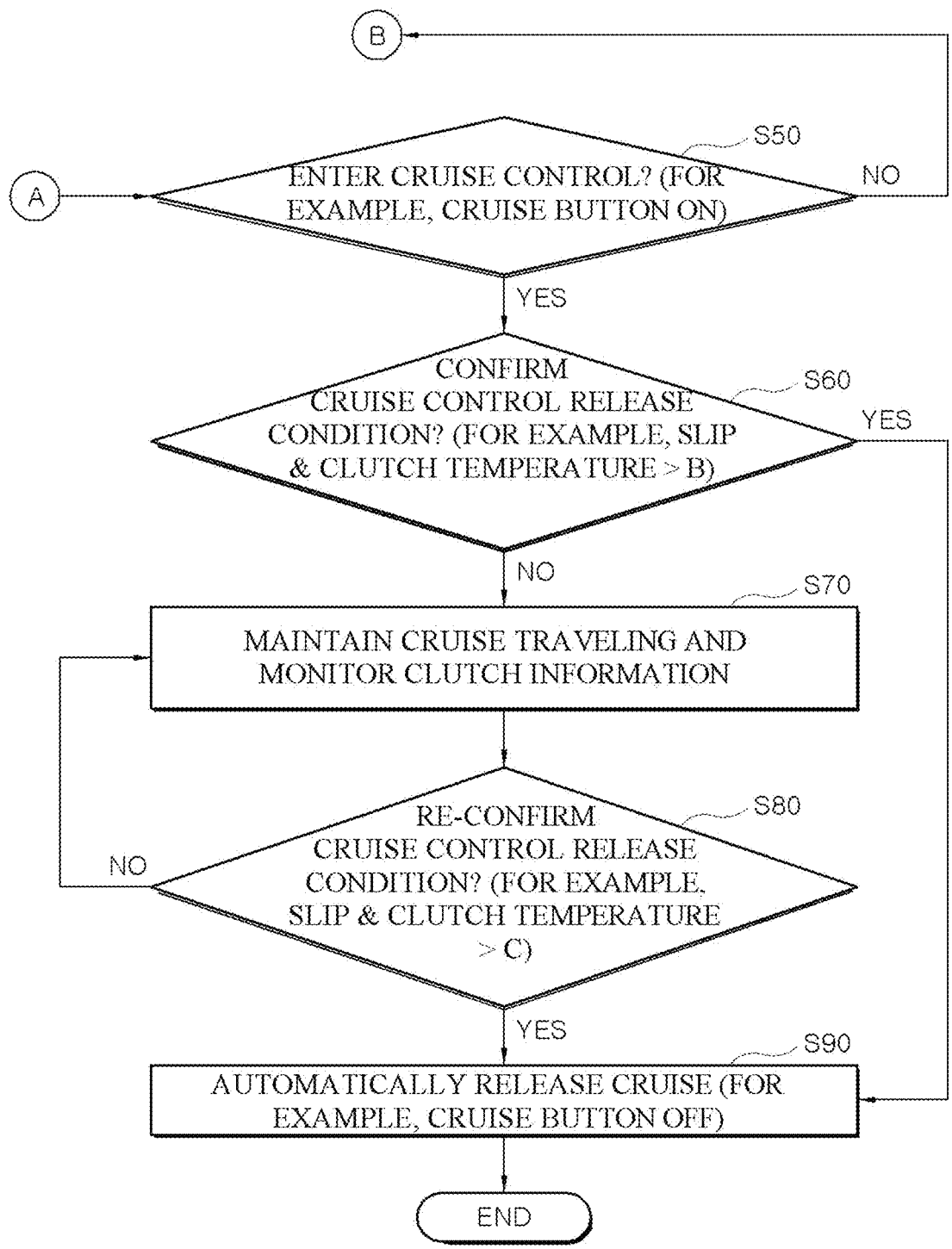

Referring to FIGS. 1A and 1B, a vehicle cruise control method confirms clutch overheating for a clutch in a clutch confirmation control (S10 to S40), prevents the clutch overheating generated by a slip of the clutch by an electronic clutch control with respect to a cruise traveling entering in a state of having no clutch overheating by stopping the cruise traveling of an auto off irrelevant to a driver in a clutch protection cruise control (S50 to S90), and fundamentally blocks the cruise traveling in the clutch overheating state in a cruise entry prohibition control (S100).

Accordingly, the vehicle cruise control is characterized by a vehicle cruise control method for protecting the clutch.

Accordingly, the vehicle cruise control method for protecting the clutch has the characteristics of previously blocking an increase in a clutch temperature generated by continuously maintaining the slip of the clutch upon a cruise operation having the characteristics in which a required torque is also constant because a difference between a target speed and a current vehicle speed is constant in the slip state of the clutch in an electronic clutch control, and particularly, fundamentally blocks a situation in which the clutch temperature may sharply increase from 67° C. to 250° C. by maintaining the slip for several minutes to increase to 320° C. or more causing damage to the component of the clutch by monitoring clutch information (S70) during the cruise traveling.

Figure 2:
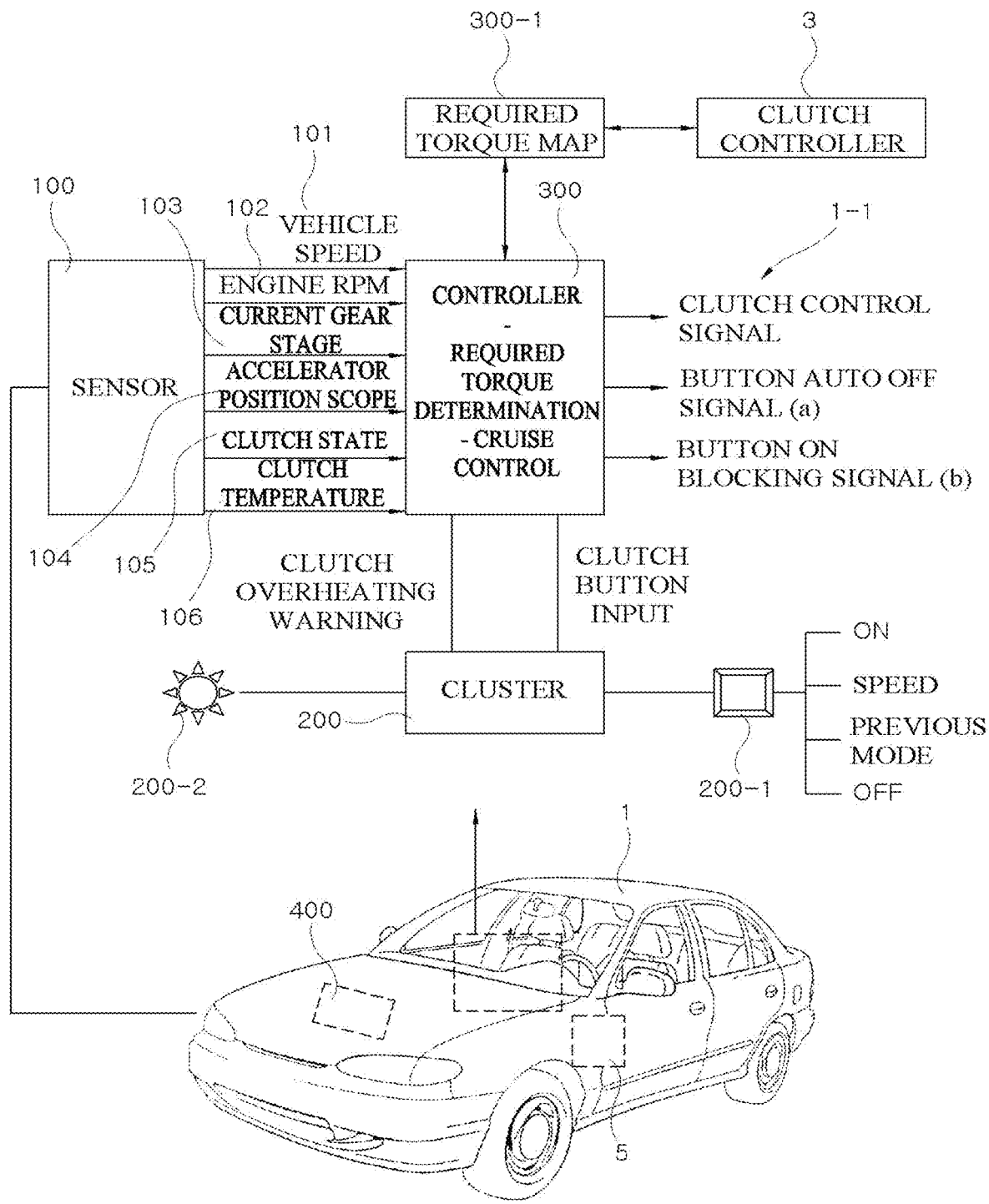
FIG. 2 is a diagram illustrating an example of a vehicle to which a cruise control system in which a vehicle cruise traveling control for protecting the clutch is implemented according to embodiments of the present disclosure is applied.

Referring to FIG. 2, a vehicle 1 includes a cruise control system 1-1.

Particularly, the cruise control system 1-1 generates a button auto OFF signal (a) or a button ON blocking signal (b) in the case of a situation in which the temperature of a clutch 400 may increase to 320° C. or more, which causes damage to the component, based on the generation of a clutch control signal, thereby preventing the damage to the component due to the increase in the temperature of the clutch 400.

As an example, the vehicle 1 includes a clutch controller 3 connected with the cruise controller 300 of the cruise control system 1-1 via a controller area network (CAN) and an accelerator pedal 5. In this case, the clutch controller 3 transmits and receives data to and from the cruise controller 300 while controlling the clutch 400 as lock/slip/open regardless of a driver, and usually applies a transmission control unit (TCU). The accelerator pedal 5 transmits an accelerator position scope generated when being depressed by the driver to the cruise controller 300.

Specifically, the cruise control system 1-1 includes a sensor unit 100, a cluster 200, a cruise button 200-1, a clutch warning lamp 200-2, and a cruise controller 300.

As an example, the sensor unit 100 is a basic sensor mounted on the vehicle 1, and includes a vehicle speed sensor 101 detecting a speed, an engine RPM sensor 102 measuring a revolution per minute (RPM) of an engine, a gear stage sensor 103 detecting the location of shift gear stages (P, N, R, D), a pedal sensor 104 detecting the accelerator position scope of the accelerator pedal 5, a clutch sensor 105 detecting an operating state of the clutch 400 as the lock/slip/open, and a clutch temperature sensor 106 detecting the temperature of the clutch 400.

As an example, the cluster 200 configures a driver seat of the vehicle 1 to provide speed/engine RPM/coolant temperature/oil temperature as basic functions, processes the signal of the cruise button 200-1 to send it to the cruise controller 300, and has the clutch warning lamp 200-2 turned on upon clutch overheating.

Particularly, the cluster 200 includes a cruise traveling display part which displays an optimal gear stage determined by the cruise controller 300 to the driver in text or graphics. In this case, the cruise traveling display part is a basic component of a general cruise control system.

As an example, the cruise button 200-1 is provided on the cluster 200 in a push button type or a dial rotation type operated by the driver. The clutch warning lamp 200-2 generates the visibility effect of a bulb or light-emitting diode (LED) type and is provided on the cluster 200.

Particularly, the cruise button 200-1 has an ON function for a cruise operation, an OFF function for releasing a cruise as a basic operation function, and includes a speed function for adjusting a target speed and a previous mode function for switching the cruise operation to a previous target speed.

As an example, the cruise controller 300 includes a memory storing, as a program, logic for the clutch confirmation control (S1 to S40), the clutch protection cruise control (S50 to S90), and the cruise entry prohibition control (S100), and operates as a central processing unit (CPU) in which the logic is executed.

Accordingly, the cruise controller 300 performs a cruise control by recognizing an input signal of the cruise button 200-1 of the driver sent from the cluster 200, and determines the required torque by matching the vehicle speed of the vehicle speed sensor 101, the engine RPM of the engine RPM sensor 102, the shift gear stages (P, N, R, D) of the gear stage sensor 103, and the accelerator position scope of the pedal sensor 104 with the traveling state. In this case, the set target speed may be changed during the cruise operation according to the driver's button input.

To this end, the cruise button 200-1 is connected to a required torque map 300-1, and the required torque map 300-1 has a target speed-current vehicle speed matching table to provide the cruise controller 300 with the required torque by a difference value between the target speed and the current vehicle speed upon cruise entry.

Furthermore, the cruise controller 300 further generates the button auto OFF signal (a) and the button ON blocking signal (b) connected with a clutch temperature detection value of a clutch temperature sensor 106 in addition to a clutch control signal connected with the clutch controller 3 for operating the clutch 400, and a clutch overheating warning signal for operating the clutch warning lamp 200-2.

Particularly, the button auto OFF signal (a) switches the cruise button 200-1 from ON to OFF regardless of the driver when there is a risk that the temperature of the clutch 400 is overheated to the temperature causing the damage to the component during the cruise traveling of the vehicle 1. Accordingly, the button auto OFF signal (a) is connected with an OFF function of the cruise button 200-1 by an electric circuit so that a power circuit may be blocked or switched, or the button may be pressed or return to the original location.

On the other hand, the button ON blocking signal (b) blocks the ON function of the cruise button 200-1 regardless of the driver when there is a risk that the temperature of the clutch 400 is overheated to the temperature causing the damage to the component while the vehicle 1 attempts to enter the cruise control, thereby preventing the cruise operation from being performed even when the driver requests the cruise operation as in the case of the states of the vehicle such as the non-engagement of the gear, too low or high vehicle speed, and failure of the system.

Accordingly, the button ON blocking signal (b) is connected with the ON function of the cruise button 200-1 by an electric circuit so that the power circuit may be blocked or switched.

Hereinafter, the vehicle cruise control method for protecting the clutch illustrated in FIGS. 1A and 1B will be described in detail with reference to FIGS. 2 to 4. In this case, the control subject is the cruise controller 300, and the control target is a cruise control including the cruise button 200-1.

First, the cruise controller 300 confirms the clutch overheating in the clutch confirmation control (S10 to S40). To this end, the clutch confirmation control (S10 to S40) includes detecting vehicle information (S10), confirming clutch information (S20), confirming a clutch state (S30), and determining clutch overheating (S40).

Referring to FIG. 2, the cruise controller 300 confirms a current gear stage (for example, D) and the accelerator position scope of the pedal sensor 104 via the CAN among the vehicle speed of the vehicle speed sensor 101, the engine RPM of the engine RPM sensor 102, and the shift gear stages (P, N, R, D) of the gear stage sensor 103.

Accordingly, the detecting of the vehicle information (S10) is performed by confirming, by the cruise controller 300, the vehicle speed, the engine RPM, the gear stage, the brake/accelerator pedal position scopes, the clutch state (lock, slip, or open), and the clutch temperature. In addition, the confirming of the clutch information (S20) is performed by classifying, by the cruise controller 300, the position scope, the clutch state (lock, slip, or open), and the clutch temperature among the vehicle information with the clutch 400.

Figure 3:
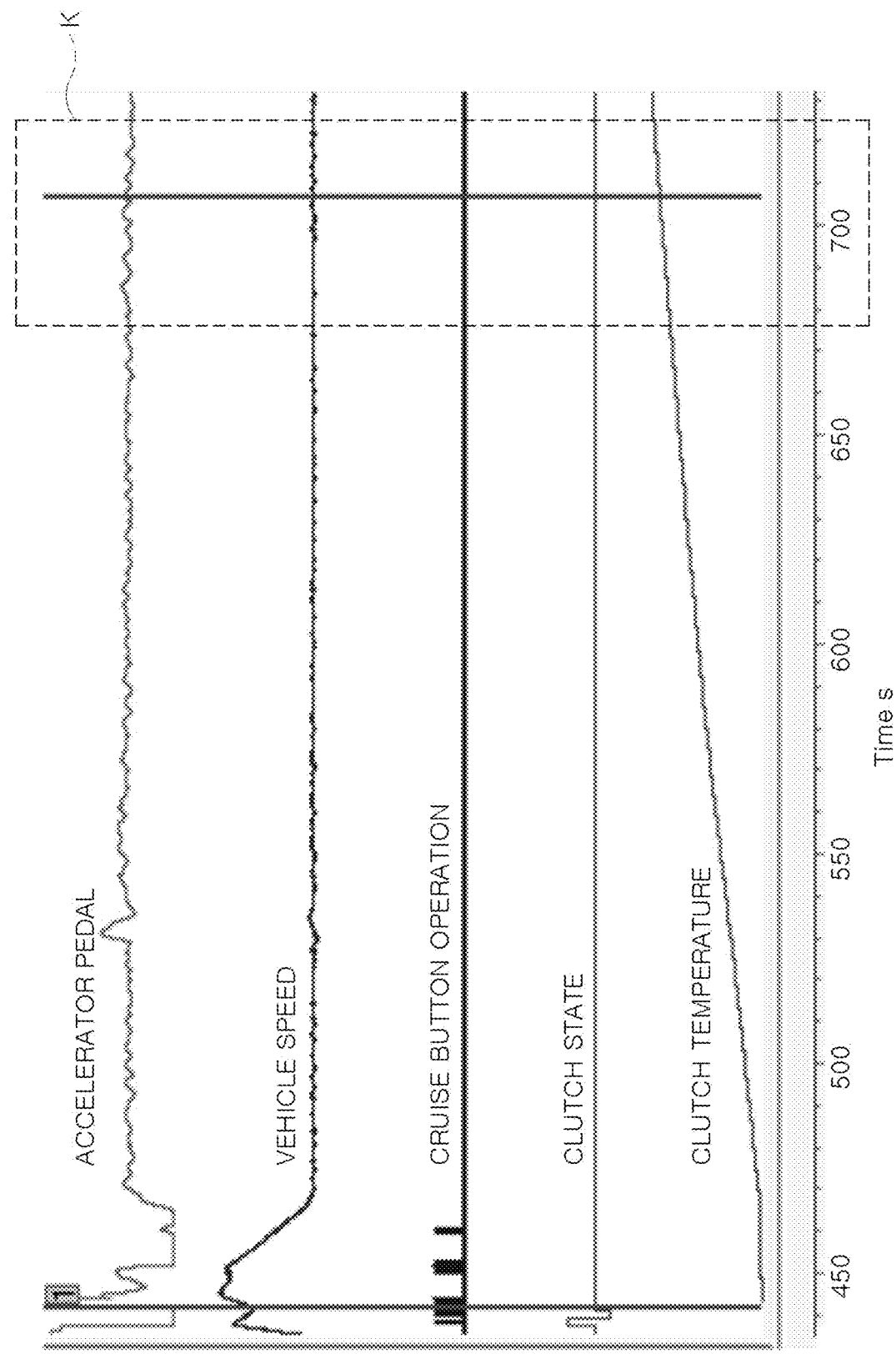
FIG. 3 is a diagram illustrating an example of an increase in a clutch temperature in the vehicle according to embodiments of the present disclosure.

FIG. 3 illustrates simulation results for the temperature increasing in the state where the clutch 400 is in the slip state. As illustrated, the simulation result experimentally shows that the temperature of the clutch 400 maintaining the over slip for a few minutes increases to 250° C., so that the damage possibility is greatly increased with respect to the component of the clutch 400 in the temperature environment (K) of 320° C. or more.

Accordingly, the confirming of the clutch state (S30) is performed by confirming, by the cruise controller 300, any one of the lock, open, and slip of the clutch 400 at the time of measuring the vehicle information. In addition, the determining of the clutch overheating (S40) is performed by confirming the clutch temperature of the clutch 400 as a component damage risk temperature.

To this end, the determining of the clutch overheating (S40) is performed by the following clutch temperature confirmation formula:

$$\text{clutch temperature} > A \quad \text{Clutch temperature confirmation formula:}$$

where "clutch temperature" refers to a current measured temperature value of the clutch 400, and "A" refers to a cruise blocking clutch temperature threshold indicating the clutch temperature at which the cruise entry is blocked, and is set to less than about 300° C. but preferably set to about 250° C., which is to reflect that the increase in the clutch temperature may increase faster depending on the weight of the vehicle and the traveling state of the vehicle. In addition, ">" refers to an inequality sign indicating the size relationship between two values.

As a result, the cruise controller 300 switches to the prohibiting of the cruise entry (S100) if the clutch temperature is the cruise blocking clutch temperature threshold (A) or more in the determining of the clutch overheating (S40). In this case, the clutch overheating temperature may be applied to the cruise blocking clutch temperature threshold (A).

Figure 4:
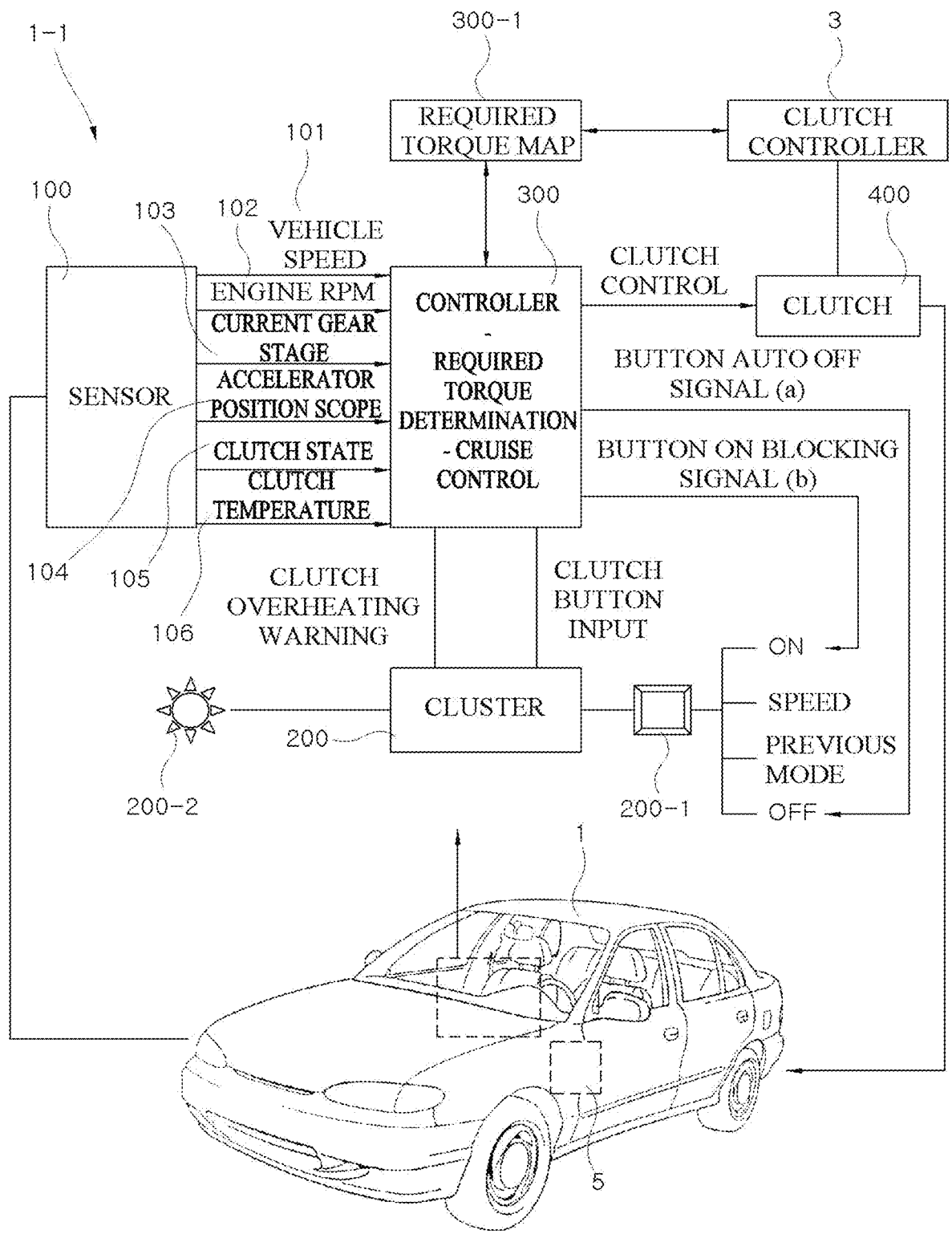
FIG. 4 is a diagram illustrating a state where the cruise control system controls a cruise traveling for protecting the clutch in the vehicle according to embodiments of the present disclosure.

Referring to FIG. 4, the cruise controller 300 generates the button ON blocking signal (b) upon the overheating of the clutch 400, so that even if the driver operates the cruise button 200-1 as ON, the cluster 200 does not generate a cruise operating signal, thereby fundamentally blocking the proceeding of the cruise control. In addition, the cruise controller 300 sends a clutch overheating warning signal to the clutch warning lamp 200-2 when the button ON blocking signal (b) is generated to turn on the clutch warning lamp 200-2, thereby causing the driver to recognize the cruise traveling entry impossibility due to the clutch overheating with the visibility effect.

Accordingly, the prohibiting of the cruise entry (S100) prevents the cruise control system 1-1 from operating until the clutch overheating is released regardless of the traveling state of the vehicle 1.

On the other hand, the cruise controller 300 enters the clutch protection cruise control (S50 to S90) if the clutch temperature is less than the cruise blocking clutch temperature threshold (A) in the determining of the clutch overheating (S40), thereby normally maintaining the operation of the cruise control system 1-1 without the clutch overheating. In this case, the clutch overheating temperature may be applied to the cruise blocking clutch temperature threshold (A).

Specifically, the clutch protection cruise control (S50 to S90) includes confirming the cruise control entry (S50), and confirming clutch protection (S60 to S80) which confirms the increase in the clutch temperature as one or more cruise control release conditions during the cruise operation, and automatically releasing the cruise (S90). Accordingly, the clutch protection cruise control (S50 to S90) prevents the clutch overheating generated by the slip of the clutch by the electronic clutch control by stopping the cruise traveling by the auto OFF irrelevant to the driver in the cruise control release control (S50 to S90) with respect to the entered cruise traveling.

Referring to FIG. 4, the cruise controller 300 enters the cruise control by recognizing the input signal of the ON signal of the cruise button 200-1 of the driver sent from the cluster 200. Subsequently, the cruise controller 300 performs the cruise control while transmitting to the clutch controller 3 the required torque determined in connection with the required torque map 300-1 by matching the vehicle speed of the vehicle speed sensor 101, the engine RPM of the engine RPM sensor 102, the gear shift stages (P, N, R, D) of the gear stage sensor 103, and the accelerator position scope of the pedal sensor 104 with the traveling state, and changes the set target speed by the input of the speed button or the previous mode button of the cruise button 200-1 by the driver during the cruise operation.

Accordingly, the entering of the cruise control (S50) is performed by the cruise button ON.

In addition, the confirming of the clutch protection (S60 to S80) includes confirming a cruise control release condition (S60), operating the cruise in which the clutch is continuously monitored during the cruise traveling (S70), and re-confirming the cruise control release condition (S80).

As an example, the confirming of the cruise control release condition (S60) is performed by the following clutch overheating protection formula of the operating state (for example, the slip) of the clutch 400 confirmed by the clutch sensor 105 and the current temperature value of the clutch 400 detected by the clutch temperature sensor 106.

$$\text{slip \& clutch temperature} > B \quad \text{Clutch overheating protection formula:}$$

where "slip" refers to a state generated during the cruise operation of the clutch 400, "clutch temperature" refers to the current measured temperature value of the clutch 400 during the cruise traveling, and "B" refers to a clutch overheating temperature threshold indicating the clutch overheating temperature, and is preferably set to about 250° C. considering that the increase in the clutch temperature increases faster depending on the weight of the vehicle and the traveling state of the vehicle but may be set to less than about 300° C. In addition, "&" refers to an "AND" condition, and ">" refers to an inequality sign indicating the size relationship between two values.

As a result, the cruise controller 300 switches to the automatically releasing of the cruise (S90) if the clutch temperature is the clutch overheating temperature threshold (B) or more in the slip state of the clutch 400 in the confirming of the cruise control release condition (S60). On the other hand, if the clutch 400 is in the slip state but the clutch temperature is less than the clutch overheating temperature threshold (B), the cruise controller 300 enters the operating of the cruise (S70).

As an example, the operating of the cruise (S70) indicates that the vehicle 1 is cruise-controlled.

Subsequently, the re-confirming of the cruise control release condition (S80) is performed by the following clutch damage protection formula of the operating state (for example, the slip) of the clutch 400 confirmed by the clutch sensor 105 and the current temperature value of the clutch 400 detected by the clutch temperature sensor 106.

$$\text{slip \& clutch temperature} > C \quad \text{Clutch damage protection formula:}$$

where "slip" refers to the state during the cruise operation of the clutch 400, "clutch temperature" refers to the current measured temperature value of the clutch 400 during the cruise traveling, and "C" refers to the clutch damage temperature threshold indicating the component damage risk temperature and is set to about 300° C. or less than 320° C. in consideration of the risk of damage to the component of the clutch 400. In addition, "&" refers to an "AND condition", and ">" refers to an inequality sign indicating the size relationship between two values.

As a result, the cruise controller 300 is fed back to the operating of the cruise (S70) if the clutch 400 is in the slip state but the clutch temperature is less than the clutch damage temperature threshold (C) in the re-confirming of the cruise control release condition (S80).

On the other hand, the cruise controller 300 switches to the automatically releasing of the cruise (S90) if the clutch temperature is the clutch damage temperature threshold (C) or more in the slip state of the clutch 400 in the re-confirming of the cruise control release condition (S80).

Referring to FIG. 4, the cruise controller 300 generates the button auto OFF signal (a) for preventing the slip of the clutch 400, and the clutch overheating and damage to the component of the clutch in the confirming of the cruise control release condition (S60) and the re-confirming of the cruise control release condition (S80).

Accordingly, the automatically releasing of the cruise (S90) switches from the current ON function of the cruise button 200-1 to OFF with the button auto OFF signal (a) by the cruise controller 300 regardless of the driver, thereby helping to escape from the risk of the slip of the clutch maintained for a few minutes by the clutch controller 300.

Then, the clutch controller 300 controls the lock/slip/open of the clutch 400 in a method for matching the re-adjustment of the target speed of the vehicle 1 changed by stopping the cruise operation with the accelerator position scope or a method for matching the re-adjustment of the target speed of the vehicle 1 with the engagement of the high stage gear or the lower stage gear compared to the current vehicle speed.

As described above, the cruise control system 1-1 applied to the vehicle 1 according to the present exemplary embodiments may perform the clutch protection cruise control (S50 to S90) which releases the cruise operation with respect to the increase in the clutch temperature confirmed by the cruise control release condition one or more times during the cruise operation, when the cruise input is confirmed by the cruise controller 300 in the state where the clutch 400 is not overheated while the vehicle travels, thereby changing the electronic clutch control so that the increase in the temperature of the clutch slip does not damage the clutch upon the cruise traveling, and particularly, may use the clutch temperature as a control variable in the slip state of the clutch 400 of the electronic clutch control of the clutch controller 3, thereby releasing or prohibiting the cruise control during the cruise traveling regardless of the operation of the cruise button 200-1 by the driver.

What is claimed is:

1. A method of operating a vehicle cruise control, the method comprising:
   confirming, by a cruise controller, a cruise input while a vehicle travels; and
   releasing a cruise operation based on an increase in a clutch temperature confirmed by a cruise control release condition one or more times during the cruise operation.

2. The method of claim 1, further comprising confirming by the cruise controller overheating of a clutch in a clutch state of lock, open, or slip by a clutch controller.

3. The method of claim 1, further comprising turning on a clutch warning lamp on a cluster when the cruise operation is released.

4. The method of claim 1, further comprising:
   entering a cruise control recognizing an ON signal of a cruise button as an input signal;
   confirming clutch protection confirming the cruise control release condition checked one or more times; and
   automatically releasing the cruise operation.

5. The method of claim 4, wherein confirming the clutch protection comprises:
   confirming the cruise control release condition with clutch information measured by a clutch;
   operating the cruise operation in which the clutch is continuously monitored during cruise traveling; and
   re-confirming the cruise control release condition with the clutch information measured by the clutch again.

6. The method of claim 5, wherein the clutch information includes a slip of the clutch and the clutch temperature.

7. The method of claim 5, wherein confirming the cruise control release condition comprises applying a clutch overheating temperature threshold to the clutch temperature measured by the clutch in a slip state.

8. The method of claim 7, wherein the clutch overheating temperature threshold is applied with less than a clutch damage temperature.

9. The method of claim 5, wherein re-confirming the cruise control release condition comprises applying a clutch damage temperature threshold to the clutch temperature measured by the clutch in a slip state.

10. The method of claim 9, wherein the clutch damage temperature threshold is applied with a clutch damage temperature or more.

11. The method of claim 4, wherein automatically releasing the cruise operation comprises stopping the cruise operation by switching the cruise button to an OFF signal in the cruise controller.

12. The method of claim 11, wherein switching to the OFF signal further comprises alerting a driver by turning on a clutch warning lamp provided on a cluster.

13. The method of claim 1, further comprising performing a clutch confirmation control for confirming overheating of the clutch, wherein performing the clutch confirmation control comprises:
detecting vehicle information in the vehicle;
confirming clutch information for the clutch;
confirming a clutch state with a clutch temperature; and
confirming the overheating.

14. The method of claim 13, wherein the vehicle information includes at least one of a vehicle speed, an engine RPM, gear stages, an accelerator position scope, lock/slip/open state of the clutch, or the clutch temperature.

15. The method of claim 13, wherein confirming the clutch state comprises applying a cruise blocking clutch temperature threshold to the clutch temperature.

16. The method of claim 15, wherein the cruise blocking clutch temperature threshold is applied with a clutch damage temperature or a clutch overheating temperature.

17. The method of claim 13, further comprising:
blocking the cruise input when the overheating is confirmed; and
turning on a clutch warning lamp provided on a cluster to alert a driver that entering cruise traveling is not possible.

18. A cruise control system comprising:
a sensor unit configured to detect vehicle information while a vehicle travels;
a cruise controller configured to receive the vehicle information, to prevent a cruise operation before entering the cruise operation by blocking a cruise input upon confirmation of overheating of a clutch based on the vehicle information, and to release a cruise operation based on an increase in a clutch temperature confirmed by a cruise control release condition checked one or more times during the cruise operation; and
a cruise button configured to switch the cruise input from ON to OFF by releasing the cruise operation.

19. The cruise control system of claim 18, wherein the sensor unit comprises a vehicle speed sensor configured to detect a speed, an engine RPM sensor configured to measure a revolution per minute (RPM) of an engine, a gear stage sensor configured to detect a location of shift gear stages, a pedal sensor configured to detect an accelerator position scope of an accelerator pedal, a clutch sensor configured to detect an operation state of the clutch as lock/slip/open, or a clutch temperature sensor configured to detect a temperature of the clutch.

20. The cruise control system of claim 18, wherein:
the cruise controller is connected with a cluster;
the cluster is configured to transfer an operating signal of the cruise button to the cruise controller; and
the cluster has a clutch warning lamp configured to turn on when the cruise operation is prevented and when the cruise operation is released.

* * * * *